United States Patent [19]

Lukasczyk et al.

[11] Patent Number: 4,478,250
[45] Date of Patent: Oct. 23, 1984

[54] PRESSURE CONTROL VALVE

[75] Inventors: Wolfgang Lukasczyk; Roland Ewald, both of Lohr am Main, Fed. Rep. of Germany

[73] Assignee: Mannesmann Rexroth GmbH, Lohr am Main, Fed. Rep. of Germany

[21] Appl. No.: 363,938

[22] Filed: Mar. 31, 1982

[30] Foreign Application Priority Data

Apr. 9, 1981 [DE] Fed. Rep. of Germany ....... 3114437

[51] Int. Cl.$^3$ ............................................. F15B 13/044
[52] U.S. Cl. .................................. 137/625.65; 91/433
[58] Field of Search ...................... 137/625.65, 625.66; 91/433

[56] References Cited

U.S. PATENT DOCUMENTS

| | | | |
|---|---|---|---|
| 2,536,965 | 1/1951 | Taylor | 137/625.66 |
| 3,015,317 | 1/1962 | Buchanan et al. | 137/625.63 |
| 3,799,200 | 3/1974 | Tipton | 91/433 X |
| 4,227,549 | 10/1980 | Adams | 137/625.69 |
| 4,397,614 | 8/1983 | Larner | 137/625.66 X |

FOREIGN PATENT DOCUMENTS 405666 9/1943 Italy ................................. 137/625.66

Primary Examiner—Gerald A. Michalsky
Attorney, Agent, or Firm—Posnack, Roberts, Cohen & Spiecens

[57] ABSTRACT

A pressure control valve construction comprising a valve body having an inlet port adapted for connection to a pressure source, a pair of working ports adapted for connection to respective loads, and a pair of outlet ports connected to a reservoir. A control spool is movably mounted in a bore in the body and includes lands for respectively controlling communication between the inlet port and respective ones of the working ports and between the working ports and the outlet ports. The control spool has opposite ends with blind bores respectively provided therein, and sensing spools are respectively mounted for sliding movement in the blind bores to define spaces between the bottoms of the blind bores and the sensing spools. The spaces communicate with the working port via respective openings in the control spool. In the case of a double acting valve, an actuator is provided at each end for acting on a respective sensing spool whereas for a single acting control valve only one actuator is provided.

17 Claims, 2 Drawing Figures

4,478,250

PRESSURE CONTROL VALVE

FIELD OF THE INVENTION

The invention relates to a pressure control valve.

PRIOR ART

Conventional pressure control valves allow obtaining a pressure output signal which is proportional to the actuating force acting on the control spool for its adjustment. The larger the adjusting force of the control spool the higher the pressure in the working port.

In a conventional pressure control valve, the opposed faces of the control spool are defined from a sensing area and on each face a secondary pressure acts which is produced in the working port. With a preselected adjustment of the control spool by means of activating a proportional solenoid, the inlet port is connected to a working port thus building up a load responsive to secondary pressure. This pressure when applied to the sensing area results in moving the control spool in a direction opposite the actuating force until the actuating force and the secondary pressure reach a balance. It is inherent in the conventional pressure control valve that the diameter of the control spool determines the size of the pressure sensing areas. To change the pressure range, the control spool and thus the complete valve, must be replaced. Furthermore the secondary pressure acts in the spaces between the control spool and the proportional solenoid so that particular sealing means are necessary for sealing off the solenoid.

OBJECTS OF THE INVENTION

An object of this invention is to provide a pressure control valve which allows adjustment of the range of the secondary pressure by using a simple structure. It is a further object of the invention to maintain constant the amount of fluid flow through the valve when the pressure range is changed. It is a still further object of the invention to provide a valve which is particularly simple and less expensive in manufacturing.

SUMMARY OF THE INVENTION

According to the invention, the size of the pressure sensing area is determined by the diameter of the sensing piston and thus by the diameter of the sensing piston bore in the control spool and the secondary pressure in the working port is applied to the space between the control spool and the sensing spool. Accordingly it is particularly easy to adjust the pressure range of the secondary pressure to different values by changing the diameter of the sensing piston. For example, to increase the adjustment range for the pressure, the diameter of the sensing piston is decreased in order to generate an identical counterforce with the actuating force being maintained constant to close the connection between the working port and the inlet port when the desired pressure is reached. Accordingly changing the pressure adjustment range of the valve may be obtained by just replacing the control spool. A further advantage is that the pressure control area is independent of the diameter of the control spool so that the outer diameter and thus the flow cross section for the fluid from the inlet port into the working port remains unchanged for all dimensions of control spools to be used. The flow capacity of the valve is thus kept constant for a complete variety of pressure adjustment ranges. The valve according to the present invention is characterized by a simple structure allowing a less expensive manufacture.

DETAILED DESCRIPTION

Figure 1:
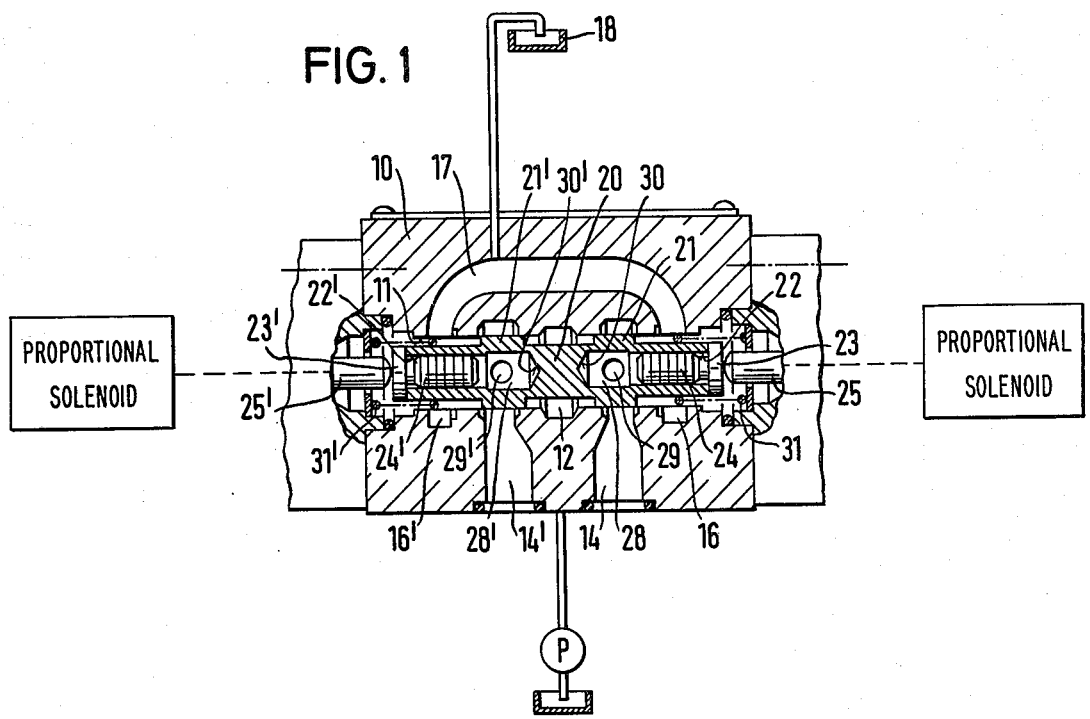
FIG. 1 is a section through a double acting pressure control valve.

Referring now to FIG. 1, a direct operated, double acting three way pressure control valve is shown. Opposite faces each of the control spool thereof are operated by a proportional solenoid. Each proportional solenoid consists of a controllable oil-immersed DC-solenoid which transforms an electrical signal into a proportional force. An increased current thus brings about a correspondingly higher solenoid force. The set solenoid force remains constant over the whole control stroke of the control spool. The details of the construction of the proportional solenoids are not shown in the drawings.

According to the drawings the valve body 10 comprises an axial bore 11 including a plurality of annular grooves. A central annular groove is defined to be the inlet port 12 which is connected to a suitable fluid pressure source in a manner not shown. A working port 14 and 14' as well as an outlet port 16 and 16' each are located adjacent both sides of the inlet port. The outlet ports 16 and 16' are connected to each other through a channel 17 which is connected to a reservoir 18 through a return line which is not shown in detail.

A control spool 20 is movably located in bore 11 and comprises control lands 21 and 21'. In moving the spool, the control lands serve to provide fluid connection between the inlet port 12 and one of the working ports 14 or 14' and serves further for interrupting the fluid connection between the working port and one of the outlet ports 16 or 16'.

A pair of fluid bores 22 and 22' are respectively provided in each head face of the control spool 20 and sensing spools 24 and 24' are movably located in each bore. Each sensing spool 24,24' has an outwardly extending flange 23,23' which can rest upon the head face of the control spool. Plunger 25 and 25' of each proportional solenoid act upon flanges 23 and 23' of its corresponding sensing spool. The proportional solenoids are not shown in the drawings but each is bolted in a known manner to one side of the valve body 10.

Internal spaces 28 and 28' are each defined between the control spool and each sensing spool and the spaces are connected through radial bores 29 and 29' to corresponding working ports 14 and 14'. The wall area 30 or 30' opposite the sensing spool is defined to be the pressure sensing area.

The control spool 20 is maintained by springs 31, 31' in the neutral position, as shown in which the working ports 14 and 14' are opened to the outlet ports 16 and 16' so that fluid may freely flow to the reservoir 18. Further, the fluid connection between the inlet port 12 and the working ports is closed in the neutral position. The pressure prevailing in the outlet ports 16 and 16' are connected to reservoir 18 and act on the outer faces of the control spool or, respectively, the sensing spools so that the proportional solenoids must be merely sealed against low reservoir pressure.

The operation is as follows: When the left proportional solenoid is excited with a predetermined current proportional to the pressure to be adjusted, a corresponding actuating force is produced which acts on the plunger 25' and on the control spool 20 via the flange 23' of the sensing spool 24' which flange rests upon the control spool to move the latter to the right. Accordingly pressure medium flows from the inlet port 12 past the control hand 21 into the working port 14 and from there to a load (not shown) which may be, for example, a servo motor which is thus operated.

The pressure control valve shown need not be connected to a servo cylinder, but may be used as a pilot valve for a proportional directional control valve.

A load responsive secondary pressure is built up in the working port 14 which secondary pressure is applied through the radial bore 29 to the space 28 acting on the pressure sensing area 30, while the sensing spool 24 is supported on the plunger 25 of the proportional solenoid which is not operated. From this a pressure force results which acts in opposition to the actuating force of the plunger 25', this pressure force moving the control spool 20 to the left in a closing direction until balance between both forces is reached so that the preset working pressure of the valve is obtained. Consequently, the fluid connection between the inlet port 12 and the working port 14 is closed and the pressure in the working port is maintained constant.

When the actuating force of the plunger 25' is decreased this results in a higher pressure force acting on the control spool 20 so that the latter is moved to the left until a fluid connection is made between the working port 14 and the outlet port 16 through which connection fluid flows from the load to the reservoir 18 until the pressure is correspondingly decreased and a balance of forces between the pressure in the working port 14 and the actuating force is again obtained. Accordingly, the pressure regulating valve is now adjusted to a lower level of pressure.

Figure 2:
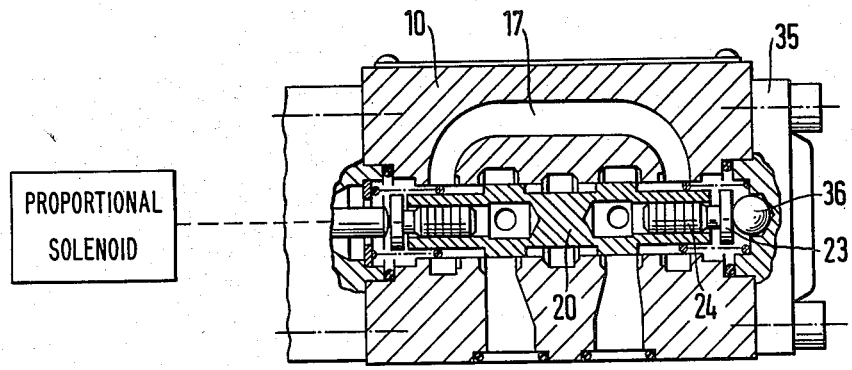
FIG. 2 is a section through a single acting pressure control valve.

In a corresponding manner, the pressure control takes place in the working port 14' when the solenoid acting on plunger 25 is actuated. In the embodiment shown in FIG. 1, the pressure in both working ports may be controlled depending on which proportional solenoid is activated. Further the pressure regulating valve may be used as a single acting valve. This is shown in FIG. 2 according to which the right hand proportional solenoid is replaced by a closure plate 35 on which the sensing spool 24 is supported via a ball 36, wherein the control spool 20 is shown in the neutral position. All remaining elements are identical with those shown in the embodiment of FIG. 1.

It is understood from the foregoing description that the control spool and the sensing spools may be mounted in the housing of a conventional four-way directional valve, which is well-known in the art, without making changes to the valve body. This is a substantial manufacturing advantage. Furthermore, throttle members may be easily mounted in the working ports 14 and 14' so that the pressure built up may be changed by said throttles. In place of the proportional solenoids, the actuating forces may be generated pneumatically or mechanically, for example by servo motors. In the neutral position as well as in the working position of the control spool, any leakage is very small as the control lands 21 and 21 are each provided with a positive overlap.

What is claimed is:

1. In a pressure control valve for controlling the fluid connection from an inlet port connected to a fluid pressure source selectively to one of a pair of working ports provided in a valve body and extending into a bore therein, said control valve comprising a control spool movable in said bore of the valve body by an actuating force proportional to the pressure to be regulated from a neutral position to a working position in which one of said working ports is connected to said inlet port, said valve body having outlet ports connected to a reservoir and respectively communicating with said working ports in said neutral position and closed off from said working ports when said spool is moved to said working position, said control spool having a pressure sensing area subjected to the pressure in said working port to move said control spool in a direction opposite said actuating force to close the fluid connection between said inlet port and the other of said working ports and to open the fluid connection from said other of said working ports and said outlet port, the improvement comprising a proportional solenoid operatively coupled with the control spool to apply an actuating force to the control spool in response to a control current supplied to the solenoid, a pair of sensing spools, said control spool having opposite ends with blind bores in said ends, said sensing spools being movably mounted in said blind bores and defining respective spaces between said sensing spools and said control spool, said control spool having respective openings connected to corresponding working ports and communicating respectively with said spaces, said sensing pressure area being at the bottom of each blind bore and facing the respective sensing spool, said sensing pressure area being determined by the diameter of the corresponding sensing spool and means for applying the actuating force from the proportional solenoid to one of said sensing spools and thereby to said control spool for automatically adjusting and maintaining a predetermined pressure on the control spool to provide a predetermined working pressure for the valve.

2. The improvement as claimed in claim 1 wherein each sensing spool comprises a flange opposite a respective end of the control spool for engagement therewith.

3. The pressure control valve of claim 1 wherein said inlet port is centrally located in said valve body and said working ports and outlet ports are respectively arranged in pairs on opposite sides of said inlet port, said control spool including control lands respectively controlling communication between corresponding working ports and said inlet port or corresponding outlet ports.

4. The pressure control valve of claim 1 comprising spring means engaging said control spool for holding the spool in said neutral position.

5. The pressure control valve of claim 4 wherein said spring means comprises first and second springs respectively acting on said control spool at opposite ends thereof.

6. The pressure control valve of claim 5 wherein said spool and said body define respective spaces receiving said first and second spring which spaces are respectively in communication with corresponding outlet ports.

7. The pressure control valve of claim 1 wherein said valve body is the housing of a four-way directional valve, said bore being an axial bore in which said control spool and said sensing spools are coaxially mounted.

8. The pressure control valve of claim 1 wherein a single proportional solenoid is provided for moving the associated sensing spool in one direction whereby said control valve is single acting.

9. The pressure control valve of claim 1 comprising a second proportional solenoid acting on the other of said sensing spools for moving said other sensing spool in a direction opposite the first said sensing spool whereby said control valve is double acting.

10. A pressure control valve construction comprising a valve body having an inlet port adapted for connection to a pressure source, a pair of working ports adapted for connection to respective loads and a pair of outlet ports connected to a reservoir, control spool means movably mounted in said body and including lands for respectively controlling communication between said inlet port and respective ones of said working ports and between said working ports and said outlet ports, said control spool means comprising a control spool having opposite ends and blind bores respectively in said ends, sensing spools respectively movably mounted in said blind bores to define spaces between the bottoms of said blind bores and said sensing spools, said control spool having respective openings connecting said spaces with respective working ports, and actuator means for applying an actuating force to at least one of said sensing spools for moving the same and the control spool therewith, said actuator means comprising a proportional solenoid connected to apply the actuating force to said one sensing spool in response to a control current supplied to the solenoid, said one sensing spool in turn applying the actuating force to the control spool which automatically adjusts itself to provide and maintain a predetermined working pressure for the valve.

11. Pressure control valve construction as claimed in claim 10, wherein said inlet port is centrally located in said valve body and said working ports and outlet ports are respectively arranged in pairs on opposite sides of said inlet port.

12. The pressure control valve of claim 10, comprising spring means engaging said control spool for holding the spool in a neutral position.

13. The pressure control valve of claim 12, wherein said spring means comprises first and second springs respectively acting on said control spool at opposite ends thereof.

14. The pressure control valve of claim 13, wherein said spool and said body define respective spaces receiving said first and second springs which spaces are respectively in communication with corresponding outlet ports.

15. The pressure control valve of claim 10, wherein said valve body is the housing of a four-way directional valve, said valve body having an axial bore in which said control spool is movable, said blind bores in said control spool being coaxial with the bore in said body.

16. A pressure control valve construction as claimed in claim 10 wherein said one sensing spool includes a flange which receives the force from the proportional solenoid, said flange facing said control spool to abut thereagainst and apply the force from the solenoid thereto.

17. A pressure control valve construction as claimed in claim 10 comprising a second proportional solenoid acting on the other of the sensing spools to apply a force thereto opposite the force applied to the first said sensing spool by the first said proportional solenoid.

* * * * *